US008007873B2

(12) United States Patent
Xie et al.

(10) Patent No.: US 8,007,873 B2
(45) Date of Patent: Aug. 30, 2011

(54) METHODS FOR PRODUCING COATED FILM

(75) Inventors: Wenbo Xie, Hainan Province (CN); Fen Fu, Hainan Province (CN)

(73) Assignee: Hainan Shiner Industrial Co., Ltd., Haikou (CN)

( * ) Notice: Subject to any disclaimer, the term of this patent is extended or adjusted under 35 U.S.C. 154(b) by 804 days.

(21) Appl. No.: 10/889,298

(22) Filed: Jul. 13, 2004

(65) Prior Publication Data

US 2005/0037152 A1 Feb. 17, 2005

(30) Foreign Application Priority Data

Jul. 30, 2003 (CN) .................................. 03 1 49872

(51) Int. Cl.
*C08F 2/46* (2006.01)
*B05D 5/08* (2006.01)
*B05D 3/06* (2006.01)
*B05D 3/02* (2006.01)

(52) U.S. Cl. ..................... 427/522; 427/544; 427/385.5; 427/412.1; 427/412.3; 427/412.4; 427/412.5

(58) Field of Classification Search ................... 427/557
See application file for complete search history.

(56) References Cited

U.S. PATENT DOCUMENTS

| | | | | |
|---|---|---|---|---|
| 3,948,666 | A * | 4/1976 | Kitanishi et al. | 430/271.1 |
| 4,024,002 | A * | 5/1977 | Lott | 156/85 |
| 4,148,322 | A * | 4/1979 | Jacaruso et al. | 450/40 |
| 4,446,348 | A * | 5/1984 | Huang et al. | 219/692 |
| 4,505,951 | A * | 3/1985 | Kennedy | 427/542 |
| 4,534,984 | A * | 8/1985 | Kuehne | 423/412 |
| 4,565,742 | A * | 1/1986 | Lang | 428/476.3 |
| 5,019,447 | A * | 5/1991 | Keller | 428/327 |
| 5,035,955 | A * | 7/1991 | Matsukura et al. | 428/520 |
| 5,232,767 | A * | 8/1993 | Hisazumi et al. | 428/213 |
| 5,316,809 | A * | 5/1994 | Hammer et al. | 428/34.8 |
| 5,446,101 | A * | 8/1995 | Anazawa et al. | 525/239 |
| 5,863,130 | A * | 1/1999 | Nguyen | 383/9 |
| 5,888,650 | A * | 3/1999 | Calhoun et al. | 428/354 |
| 6,224,975 | B1 * | 5/2001 | Wang | 428/354 |
| 6,344,245 | B1 * | 2/2002 | Kay | 427/511 |
| 6,627,282 | B2 * | 9/2003 | Hammer et al. | 428/36.92 |
| 6,713,105 | B1 * | 3/2004 | Bekele | 426/127 |
| 7,452,590 | B1 * | 11/2008 | Benim et al. | 428/212 |
| 2002/0000290 | A1 * | 1/2002 | Crump et al. | 156/245 |
| 2002/0012803 | A1 * | 1/2002 | Kending | 428/423.7 |
| 2003/0003249 | A1 * | 1/2003 | Benim et al. | 428/35.7 |
| 2003/0014901 | A1 * | 1/2003 | Dobbs et al. | 43/55 |
| 2003/0055179 | A1 * | 3/2003 | Ota et al. | 525/242 |
| 2003/0134061 | A1 * | 7/2003 | Benim et al. | 428/34.9 |
| 2004/0159654 | A1 * | 8/2004 | Ryan et al. | 219/634 |
| 2006/0068191 | A1 * | 3/2006 | Goto et al. | 428/313.3 |

FOREIGN PATENT DOCUMENTS

| | | | | | |
|---|---|---|---|---|---|
| CN | 87 1 03651 | A | | 11/1988 | |
| JP | 60-230851 | | * | 11/1985 | |
| JP | 60-230851 | A | * | 11/1985 | |
| JP | 04-260472 | | | 9/1992 | |
| JP | 06-136304 | A | * | 5/1994 | 106/271 |
| JP | 10-273587 | | * | 10/1998 | |
| JP | 10-273587 | A | * | 10/1998 | |
| JP | 2004-302125 | A | * | 10/2004 | |
| WO | WO 90/02613 | | | 3/1990 | |
| WO | WO 03/002344 | A1 | * | 1/2003 | |
| WO | WO 2005/026275 | A1 | * | 3/2005 | |

OTHER PUBLICATIONS

"PVDC," Oct. 1, 2000, w/English abstract thereof, pp. 25-30.

* cited by examiner

*Primary Examiner* — Marianne L Padgett
(74) *Attorney, Agent, or Firm* — McDermott Will & Emery LLP

(57) ABSTRACT

The present invention discloses a method for producing coated film, comprising the following procedures of: coating water-based macromolecular emulsion on the surface of a film substrate, drying the film substrate coated with emulsion with microwave, and then curing the dried film to make the coating crystallize homogeneously. The coated films produced with that method are tolerant to friction and are featured with strong resistance to scraping, high tensility, high contractility, excellent antistatic property, low surface friction factor, perfect glossiness, high oxygen and water obstruction property, and low production cost, and are especially suitable for producing high-performance thermal contracting coated films. The contracting films produced with the method may be used as esthetic and abrasion-resistant wrapping material and may help to extend quality guarantee period of articles.

8 Claims, No Drawings

METHODS FOR PRODUCING COATED FILM

FIELD OF THE INVENTION

The present invention relates to a method for producing transparent coated films that are used as wrapper for cigarettes, food, medicine, a/v boxes, and it may be used to improve surface properties of coated films by coating to implement excellent surface properties, such as high abrasion-resistance and scraping resistance, high heat-seal feature under low temperature, excellent luster, and outstanding damp and gas retarding property (e.g., oxygen retarding).

BACKGROUND OF THE INVENTION

Currently, for products (e.g., cigarettes, A/V boxes) wrapped with biaxial oriented polypropylene (BOPP) heat sealing films, the outermost layer of film will be scraped and became less transparent under friction with foreign matters, which has a strong impact on appearance of middle and high level products wrapped in boxes. To solve above problem, specialists in domestic and overseas flexible packing industry has achieve some improvement on scraping prevention for films through years of study and experimentation; however, due to limitation of production techniques (e.g., drying techniques), though fogging and scraping problems on wrapping films resulted from friction are reduced to some extend, above problem hasn't be solved substantially.

SUMMARY OF THE INVENTION

The object of the present invention is to solve above problem by improving production technique of coated film and to provide an abrasion-resistant coated film. The abbreviations used in the present invention have their common meanings in the art as follows: BOPP represents biaxially oriented polypropylene; BOPO represents biaxially oriented, heat-shrinkable multi-layer polyolefin; BOPA represents biaxially oriented polyamide; BOPET represents biaxially oriented poly(ethylene terephthalate); PVC represents polyvinyl chloride; CPP represents cast polypropylene; PVDC represents poly(vinylidene chloride); PE represents polyethylene; PVA represents polyvinyl alcohol; AC represents polyvinyl acetate.

To realize above-said object, the method for producing coated film described in the present invention employs the following technical solution of: coating a layer of water-based adhesive on the film substrate, drying it with microwave and then coating a layer of water-based emulsion, drying the film substrate coated with emulsion with microwave, and then curing the dried film to make the coating material crystallize homogeneously.

The water-based macromolecule emulsion may be coated on either side or both sides of the film substrate; for two sided coating, two methods may be used: the coating is preceded by steps, i.e., the two sides are coated successively; the coat of the two sides is proceeded in parallel.

The said film substrate may be a known contractible substrate, which is used to produce contractible coated film, such as thermal contracting flat film reels including BOPP heat sealing contractible film, BOPP contractible mono-film, BOPO film, PVC film, CPP film, BOPET film, and PE film, or a common film without thermal contraction feature, for example common BOPP film, common BOPET film, etc.

The film substrate may be produced by any known method, for example flat film biaxial tension method, bubble tube tension method, dripping method, or blowing film method.

The said water-based adhesive may be water-based polyurethane, adhesive PVDC emulsion, etc. The said water-based emulsion may be PVDC water-based emulsion, acrylic resin, or polyvinyl alcohol (PVA) paint.

The said emulsion may comprise: from 2 to 10% by weight of slip agent, from 0.1 to 0.8% by weight of anti-adhesion agent, and from 79.2 to 97.9% by weight of macromolecule emulsion.

Before coated, the surface of the film substrate maybe treated with corona to enhance bonding with the coating emulsion firmly.

It is appreciated that the intensity of the above corona treatment be greater than 36 dynes.

The said curing may be carried out for 12~120 hours at 30 ~60° C., preferably for 48 hours at 40° C.

To improve quality of the film, the film may be reeled again, after which curing is carried out.

In case a thermal contracting film is used as the film substrate, the film is extraordinary sensitive to heat because it is a thermal contracting macromolecule film material (thermal contraction ratio in length and breadth exceeds 3% at 120° C. and zero external force). Therefore, when the film substrate is coated with the traditional film coating technique, which employs infrared radiation heating and/or thermal air convection heating to dry the coating emulsion, the contractible film will contract in length and width when it passes the oven, resulting degradation of surface flatness and appearance, bad bonding between the substrate and the emulsion layer, or ripple of emulsion layer, as the result, it is impossible to process the product further. However, microwave heating is used as the drying method in the present invention, which not only ensures absolute dry of the water-based emulsion layer, but also avoid overheat of the contractible film, thus that heating method ensures solid bonding between the emulsion layer and the substrate as well as surface flatness of the film. That method reduces significantly the production cost of drying the film with traditional thermal air convection method, and helps to control more accurately the dryness of film to achieve better drying effect. In addition, to facilitate microwave drying, a water-based macromolecule emulsion material (e.g., PVDC water-based emulsion, acrylic resin or PVA paint) is used as the macromolecule emulsion to take full advantage of the merit of microwave drying, achieving uniformly dried coating, which is favorable for homogeneous crystallization of the film. Furthermore, such a material is of benefit to environmental protection and cost reduction.

Due to the fact that microwave heating and corresponding water-based macromolecule emulsion material are employed in the present invention, thermal contracting coated films or non-thermal contracting coated films produced by the method described in the present invention are featured with abrasion-resistance, scraping resistance, high tensility, high contractility, static resistance, low surface friction factor, superior glossiness, oxygen and water obstruction, and low production cost. The coated films used as wrapping material is esthetic in appearance, abrasion-resistant, and helps to elongate the quality guarantee period of articles wrapped.

EMBODIMENTS OF THE INVENTION

The method for producing coated film in the present invention is further described in detail with the following embodiments.

Embodiment 1

The upper surface of a flat BOPP thermal contracting film is treated with corona with 40 dynes intensity; and then water-based adhesive, e.g., water-based polyurethane, adhesive PVDC emulsion, is coated on the surface of the thermal contracting film with a coating device; and water-based PVDC emulsion comprising 3% by weight of slip agent, 0.7% by weight of anti-adhesion agent of silicon dioxide, and 81% by weight of PVDC emulsion is coated on the surface; next, the thermal contracting film coated with PVDC emulsion is dried with microwaves for 48 hours at 40° C. to cure; and the cured film is reeled again at a time during the curing period and then it is continued to cure it for 48 hours, so as to make the coating crystallize and crosslink homogeneously to form an abrasion-resistant and oxygen/water obstructive surface layer; next, the cured film is slit into required products with the specifications of the client's requirement. Finally, the product is packed. The film may be used as packing material for cigarettes, foods, and medicines ideally.

Embodiment 2

The upper surface of a flat common BOPET film is treated with corona with 36 dynes intensity; then water-based adhesive (e.g., water-based polyurethane, adhesive PVDC emulsion) is coated on the surface of the thermal contracting film with a coating device; and then water-based AC emulsion comprising 8% by weight of slip agent, 0.2% by weight of anti-adhesion agent of silicon dioxide, and 88% by weight of AC emulsion, is coated on the surface; then the common BOPET film coated with AC emulsion is dried by microwaves for 10 hours at 30° C. to cure; then the film is reeled again and continue to make it cure for 110 hours, so as to make the coating layer crystallize homogeneously and crosslink to form an abrasion-resistant and oxygen/water obstructive surface layer; next, the cured film is slit into required products with the specifications of the client's requirement; finally, the product is packed.

Embodiment 3

The upper surface of a flat PVC thermal contracting film is treated with corona with 45 dynes intensity; then water-based adhesive (e.g., water-based polyurethane, adhesive PVDC emulsion) is coated on the surface of the thermal contracting film with a coating device; and water-based PVDC emulsion comprising 5% by weight of slip agent, 0.6% by weight of anti-adhesion agent, and 91% by weight of PVDC emulsion is coated on the surface; the common BOPET film coated with PVDC emulsion is dried with microwaves for 80 hours at 35° C. to make it cure, so as to make the coating layer crystallize homogeneously and crosslink to form an abrasion-resistant and oxygen/water obstructive surface layer; next, the cured film is slit into required products with the specifications of the client's requirement; finally, the product is packed.

Embodiment 4

The upper surface of a flat PE thermal contracting film is treated with corona with 48 dynes intensity; water-based adhesive (water-based polyurethane) is coated on the surface of the thermal contracting film with a coating device; and water-based PVDC emulsion comprising 2% by weight of slip agent, 0.3% by weight of anti-adhesion agent, 96% by weight of PVDC is coated on the surface; then the film coated with PVDC emulsion is dried with microwaves for 6 hours at 45° C. to make it cure; and the film is reeled again and it is continued to cure for 6 hours, so as to make the coating layer crystallize homogeneously and cross link to form an abrasion-resistant and oxygen/water obstructive surface layer; next, the cured film is slit into required specifications according to the client's requirement; finally, the product is packed.

PE films coated with PVDC produced with above method may be used as laminated layers for packages of foods and medicines. Bags produced with the film may effectively prevent infiltration of residual solvent of printing ink on outer surface, protecting foods and medicines inside from contamination of the residual solvent effectively.

What is claimed is:

1. A method for producing a coated thermal contracting film, comprising the following steps:

a) providing a thermal contracting film;

b) providing a water-based adhesive layer on a surface of the thermal contracting film;

c) providing a water-based emulsion layer on the water-based adhesive layer;

d) drying the water-based adhesive layer and the water-based emulsion layer by microwaves sufficient to crystallize and homogeneously crosslink so as to form an abrasion-resistant and oxygen and water obstructive surface layer on the surface of the thermal contracting film, wherein the step b) is performed by applying a water-based polyurethane or an adhesive PVDC (poly(vinylidene chloride)) emulsion on the surface of the thermal contracting film;

wherein the step c) is performed by applying a water-based PVDC emulsion comprising 2-10% by weight of slip agent, 0.1-0.8% by weight of anti-adhesion agent and 79.2-97.9% by weight of PVDC emulsion on the water-based adhesive layer, and wherein the step d) is performed at 30-60° C. for 12-120 hours.

2. The method for producing a coated thermal contracting film according to claim 1, further comprising the following steps:

b') providing a water-based adhesive layer on the other surface of the thermal contracting film;

c') providing a water-based emulsion layer on the water-based adhesive layer of the step b'); and d') drying the water-based adhesive layer of the step b') and the water-based emulsion layer of the step c') by microwaves sufficient to crystallize and homogeneously crosslink so as to form an abrasion-resistant and oxygen and water obstructive surface layer on the other surface of the thermal contracting film;

wherein the steps b'), c') and d') are conducted after the steps b), c) and d), or the steps b) and b'), the steps c) and c') and the steps d) and d') are simultaneously conducted, respectively;

wherein the step b') is performed by applying a water-based polyurethane or an adhesive PVDC emulsion on the other surface of the thermal contracting film;

wherein the step c') is performed by applying a water-based PVDC emulsion comprising 2-10% by weight of slip agent, 0.1-0.8% by weight of anti-adhesion agent and 79.2-97.9% by weight of PVDC emulsion on the water-based adhesive layer of the step b'), and wherein the step d') is performed at 30-60° C. for 12-120 hours.

3. The method for producing a coated thermal contracting film according to claim 1, further comprising a step of treating the surface of the thermal contracting film with a corona before the step b).

4. The method for producing a coated thermal contracting film according to claim 3, wherein the intensity of said corona treatment is greater than 36 dynes.

5. The method for producing a coated thermal contracting film according to claim 2, further comprising a step of treating the other surface of the thermal contracting film with a corona before the step b').

6. The method for producing a coated thermal contracting film according to claim 5, wherein the intensity of said corona treatment is greater than 36 dynes.

7. The method for producing a coated thermal contracting film according to claim 1, further comprising a step of reeling the coated thermal contracting film during or after the step of curing.

8. The method for producing a coated thermal contracting film according to claim 1, wherein the thermal contracting film is selected from biaxial oriented polypropylene (BOPP), biaxial oriented heat-shrinkable multi-layer polyolefin (BOPO), biaxial oriented polyamide (BOPA), poly(ethylene terephthalate) (BOPET), polyvinyl chloride (PVC), cast polypropylene (CPP) and polyethylene (PE) films.

* * * * *